(12) United States Patent
Iwai

(10) Patent No.: US 12,316,493 B2
(45) Date of Patent: May 27, 2025

(54) INFORMATION PROCESSING APPARATUS, INFORMATION PROCESSING METHOD, PROGRAM, AND INFORMATION PROCESSING SYSTEM FOR DETERMINING A DATA CENTER HAVING AN INSTANCE THAT EXECUTES AN APPLICATION

(71) Applicant: SONY GROUP CORPORATION, Tokyo (JP)

(72) Inventor: Takuya Iwai, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/919,676

(22) PCT Filed: May 6, 2021

(86) PCT No.: PCT/JP2021/017355
§ 371 (c)(1),
(2) Date: Mar. 1, 2023

(87) PCT Pub. No.: WO2021/235226
PCT Pub. Date: Nov. 25, 2021

(65) Prior Publication Data
US 2023/0246908 A1    Aug. 3, 2023

(30) Foreign Application Priority Data

May 22, 2020   (JP) .................................. 2020-089520

(51) Int. Cl.
*H04L 43/0852*   (2022.01)
*A63F 13/35*     (2014.01)
(Continued)

(52) U.S. Cl.
CPC ...... *H04L 41/0816* (2013.01); *H04L 43/0852* (2013.01); *H04L 43/0888* (2013.01)

(58) Field of Classification Search
None
See application file for complete search history.

(56) References Cited

U.S. PATENT DOCUMENTS

| 10,735,281 B1 * | 8/2020 | Burgin ..................... H04L 67/10 |
| 2006/0111187 A1 * | 5/2006 | Miyazaki .............. G06F 1/3271 |
| | | 463/31 |

(Continued)

FOREIGN PATENT DOCUMENTS

| JP | 2011-514565 A | 5/2011 |
| JP | 2015-531629 A | 11/2015 |
| JP | 6272864 B2 | 1/2018 |

OTHER PUBLICATIONS

Author: Change et al. Title: "Minimum Latency Server Selection for Heterogeneous Cloud Services" Publisher: IEEE (Year: 2014).*

(Continued)

*Primary Examiner* — Kamal M Hossain
(74) *Attorney, Agent, or Firm* — Paratus Law Group, PLLC

(57) ABSTRACT

There is provided an information processing apparatus, an information processing method, a program, and an information processing system that are capable of making a game server that executes an application appropriate. The information processing apparatus includes a decision unit. The decision unit determines, on a basis of capability information of an instance that executes an application of a data center and network information relating to communication between a user terminal and the data center, which are acquired from each of a plurality of the data centers capable of communicating with the user terminal via a network, and required specification information necessary for executing the application, a data center having an instance that executes the application used by the user terminal from the plurality of data centers.

11 Claims, 14 Drawing Sheets

(51) Int. Cl.
    *H04L 41/0816* (2022.01)
    *H04L 43/0888* (2022.01)
    *H04L 67/63* (2022.01)
    *A63F 13/70* (2014.01)
    *G06F 13/00* (2006.01)

(56) References Cited

U.S. PATENT DOCUMENTS

| | | | |
|---|---|---|---|
| 2010/0211669 A1* | 8/2010 | Dalgas | G06F 9/50 709/224 |
| 2012/0173729 A1* | 7/2012 | Lee | H04L 67/1008 709/228 |
| 2017/0050111 A1* | 2/2017 | Perry | H04L 67/131 |
| 2021/0136177 A1* | 5/2021 | Hall | H04L 41/5051 |
| 2021/0176301 A1* | 6/2021 | Mutnuru | H04L 43/10 |
| 2022/0226736 A1* | 7/2022 | Hsiung | A63F 13/352 |
| 2023/0049501 A1* | 2/2023 | Xu | H04L 67/289 |

OTHER PUBLICATIONS

Author: Dinaki et al. Title: "Boosted Metaheuristic Algorithms for QoE-Aware Server Selection in Multiplayer Cloud Gaming" Publisher: IEEE Publication Date: Apr. 9, 2020; Digital Object Identifier 10.1109/ACCESS.2020.2983080 (Year: 2020).*

* cited by examiner

FIG.3

| Game title | Scene |
|---|---|
| XXX Racing | In race |

| Instance | vCPU | vMemory | vGPU |
|---|---|---|---|
| v-instance1 | 4Core | 4GB | 4 |
| v-instance2 | 2Core | 2GB | 2 |

| Instance | User terminal 1 | | ... | User terminal N | |
|---|---|---|---|---|---|
| | Latency | Band width | | Latency | Band width |
| v-instance1 | 50ms | 50Mbps | | 60ms | 50Mbps |
| v-instance2 | 50ms | 50Mbps | | 60ms | 50Mbps |

| Instance | $/hour | Inboud($/bits) | ... | Outboud($/bits) |
|---|---|---|---|---|
| v-instance1 | 0.1 | 0.1 | | 0.1 |
| v-instance2 | 0.05 | 0.1 | | 0.1 |

| Game title | Scene | vCPU | vMemory | vGPU | ... | Latency | Band width |
|---|---|---|---|---|---|---|---|
| XXX Racing | Opening | 1 | 1GB | 1 | | 1000ms | 25Mbps |
| | Settings | 1 | 1GB | 1 | | 200ms | 10Mbps |
| | Battle | 4 | 4GB | 4 | | 50ms | 35Mbps |
| | Movie | 1 | 1GB | 1 | | 1000ms | 25Mbps |
| ... | | | | | | | |
| ZZZ Quest | Opening | 1 | 1GB | 1 | | 1000ms | 25Mbps |
| | Settings | 1 | 1GB | 1 | | 200ms | 10Mbps |
| | Battle | 2 | 4GB | 2 | | 150ms | 35Mbps |
| | Movie | 1 | 1GB | 1 | | 1000ms | 25Mbps |

FIG. 11

| User ID | party ID | Instance |
|---|---|---|
| AAA.BBB | Group 1 | v-instance1.edgeDC1.com |
| CCC.DDD | Group 2 | v-instance1.edgeDC2.com |
| EEE.FFF | Group 1 | v-instance1.edgeDC1.com |
| WWW.XXX | Group 2 | v-instance1.edgeDC2.com |
| YYY.ZZZ | n/a | v-instance1.centralDC1.com |

FIG.17

INFORMATION PROCESSING APPARATUS, INFORMATION PROCESSING METHOD, PROGRAM, AND INFORMATION PROCESSING SYSTEM FOR DETERMINING A DATA CENTER HAVING AN INSTANCE THAT EXECUTES AN APPLICATION

CROSS REFERENCE TO PRIOR APPLICATION

This application is a National Stage Patent Application of PCT International Patent Application No. PCT/JP2021/017355 (filed on May 6, 2021) under 35 U.S.C. § 371, which claims priority to Japanese Patent Application No. 2020-089520 (filed on May 22, 2020), which are all hereby incorporated by reference in their entirety.

TECHNICAL FIELD

The present technology relates to an information processing apparatus and an information processing method.

BACKGROUND ART

Patent Literature 1 describes changing a device that provides a game service. In Patent Literature 1, game play is capable of moving back and forth between a server-executed video game and a client-executed video game.

CITATION LIST

Patent Literature

Patent Literature 1: Japanese Patent No. 6272864

DISCLOSURE OF INVENTION

Technical Problem

It is desired to make a game server that executes an application appropriate.

In view of the circumstances as described above, it is an object of the present technology to provide an information processing apparatus, an information processing method, a program, and an information processing system that are capable of making a game server that executes an application appropriate.

Solution to Problem

In order to achieve the above-mentioned object, an information processing apparatus according to an embodiment of the present technology includes: a decision unit.

The decision unit determines, on the basis of capability information of an instance that executes an application of a data center and network information relating to communication between a user terminal and the data center, which are acquired from each of a plurality of the data centers capable of communicating with the user terminal via a network, and required specification information necessary for executing the application, a data center having an instance that executes the application to be used by the user terminal from the plurality of data centers.

The network information may include communication delay information, and the plurality of data centers may include at least two data centers having pieces of communication delay information with the user terminal different from each other.

The network information may further include throughput information.

The decision unit may determine, using reception of a start instruction or a stop instruction from the user terminal or a change in the network information acquired from the data center as a trigger, a data center to be used by the user terminal from the plurality of data centers.

The application may be a game application, and the decision unit may further take into consideration game title information and game scene information of the game application to be executed to determine a data center to be used by the user terminal from the plurality of data centers.

The required specification information may be set in advance for each of a plurality of different game titles and a plurality of different game scenes.

The decision unit may further take into consideration cost information acquired from each of the plurality of data centers to determine a data center to be used by the user terminal from the plurality of data centers.

The user terminal may include a plurality of user terminals, and the decision unit may determine a data center to be used by the plurality of user terminals on the basis of the capability information and the network information for each of the plurality of user terminals, which are acquired from each of the plurality of data centers, and the required specification information.

In order to achieve the above-mentioned object, an information processing method according to an embodiment of the present technology includes:

acquiring capability information of an instance that executes an application of a data center and network information relating to communication between a user terminal and the data center, from each of a plurality of the data centers capable of communicating with the user terminal via a network; and determining, on the basis of the capability information, the network information, and required specification information necessary for executing the application, a data center having an instance that executes the application to be used by the user terminal from the plurality of data centers.

In order to achieve the above-mentioned object, a program according to an embodiment of the present technology causes an information processing apparatus to execute the steps of:

acquiring capability information of an instance that executes an application of a data center and network information relating to communication between a user terminal and the data center, from each of a plurality of the data centers capable of communicating with the user terminal via a network; and determining, on the basis of the capability information, the network information, and required specification information necessary for executing the application, a data center having an instance that executes the application to be used by the user terminal from the plurality of data centers.

In order to achieve the above-mentioned object, an information processing system according to an embodiment of the present technology includes:

a user terminal;
a network;
a plurality of data centers capable of communicating with the user terminal via the network; and
an information processing apparatus including a decision unit that determines, on the basis of capability information of an instance that executes an application of the data center and network information relating to communication between the user terminal and the data center, which are acquired from each of the plurality of data centers capable of communicating with the user terminal via the network, and required specification information necessary for executing the application, a data center having an instance that executes the application to be used by the user terminal from the plurality of data centers.

BRIEF DESCRIPTION OF DRAWINGS

FIG. 3 shows an example of scene information stored in a storage unit of a data center.

FIG. 11 shows an example of required specification information stored in the storage unit of the orchestrator.

FIG. 17 shows an example of game instance information stored in the storage unit of the orchestrator of the information processing system according to the second embodiment.

MODE(S) FOR CARRYING OUT THE INVENTION

Hereinafter, the present technology will be described with reference to the drawings. In the following embodiments, a game application will be described as an example of an application.

First Embodiment

[Schematic Configuration of Information Processing System]

Figure 1:
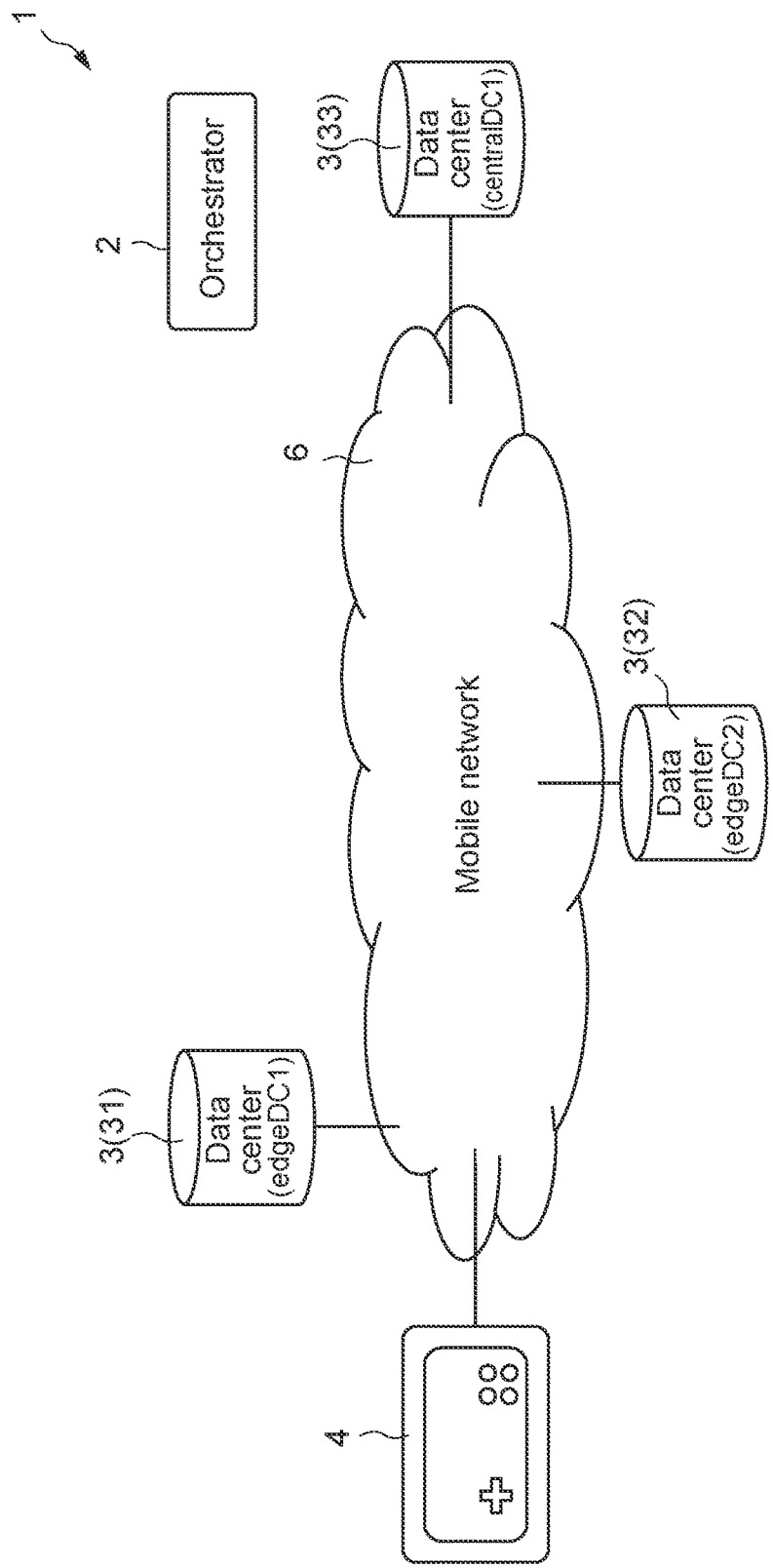
FIG. 1 is a configuration diagram of an information processing system according to a first embodiment.

FIG. 1 is a configuration diagram of an information processing system 1 according to this embodiment.

As shown in FIG. 1, the information processing system 1 includes an orchestrator 2 as an information processing apparatus, a plurality of data centers 3, a user terminal 4 owned by a game player who is a user, and a mobile network 6 as a network.

Each of the data centers 3 executes various types of calculation processing constituting a game performed by the user terminal 4 by a game player, e.g., game loci and encoding. The data center 3 executes a game application to provide a game service to the game player. The data center 3 is configured to be capable of communicating with the user terminal 4 via the mobile network 6.

The orchestrator 2 selects and determines the data center 3 that executes a game from the plurality of data centers 3. The orchestrator 2 is configured to be capable of communicating with the user terminal 4 via the mobile network 6. The orchestrator 2 is configured to be capable of communicating with the data center 3. The orchestrator 2 is capable of dynamically switching the data center that executes a game application.

The mobile network 6 is a communication path between the user terminal 4 and the data center 3.

Note that the orchestrator may operate on any of the data centers.

Further, the number of data centers 3 is three in FIG. 1 for convenience, but it is not limited thereto and only needs to be two or more. Further, the plurality of data centers 3 is denoted by reference symbols 31 to 33 to distinguish them from each other, but they will be referred to as the data center 3 in the case where it is unnecessary to distinguish them from each other. Further, in the first embodiment, a case where the number of game players is one, i.e., the number of user terminals 4 is one will be described. The number of game players may be two or more, i.e., the user terminal 4 may include a plurality of user terminals 4. A case where the user terminal 4 includes a plurality of user terminals 4 will be described below in a second embodiment.

Details will be described below.

[Details of Each Configuration]

(Configuration of Data Center)

The data centers 31, 32, and 33 have similar basic configurations.

In the example of FIG. 1, the data centers 31 and 32 are each an edge data center (edge DC). The data center 33 is a central data center (central DC). The edge data center has a short communication delay time with the user terminal 4 owned by a game player (in other words, the latency is small) and the central data center has a long communication delay time with the user terminal 4 (in other words, the latency is large). Typically, the edge data center has limited server resources as compared with the central data center and the cost of using server resources is high. Meanwhile, typically, the edge data center is closer to the user terminal than the central data center.

At least one of the plurality of data centers 3 has a communication delay time (hereinafter, referred to as the Latency in some cases.) with the user terminal 4 different from those of the other data centers 3.

Figure 2:
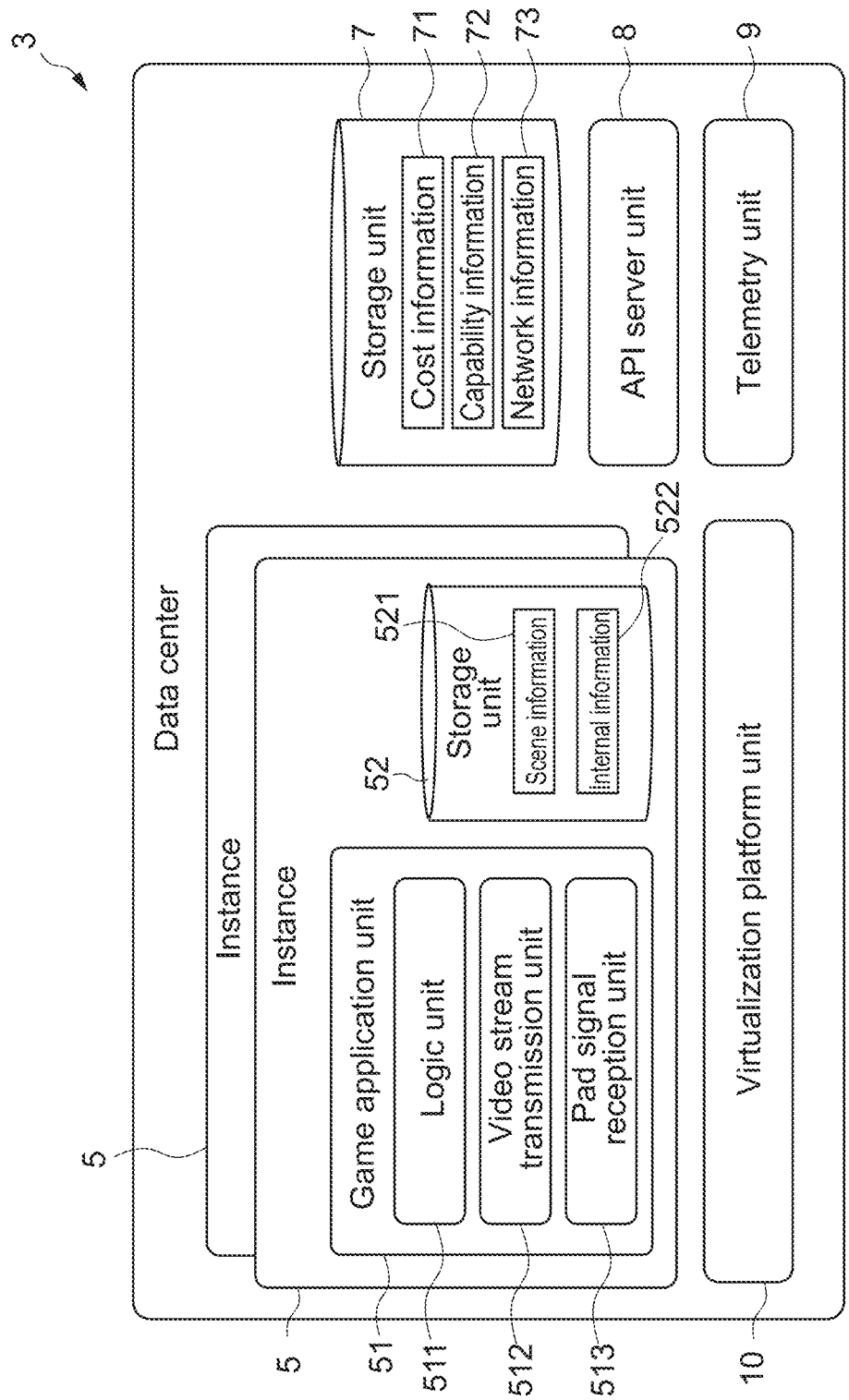
FIG. 2 is a functional block diagram of a data center constituting part of an information processing system according to the first embodiment and a second embodiment.
Figure 3:
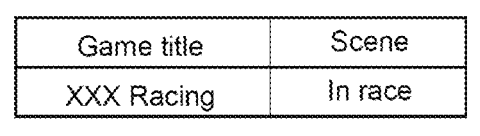
Figures 4, 5, 6, 7:
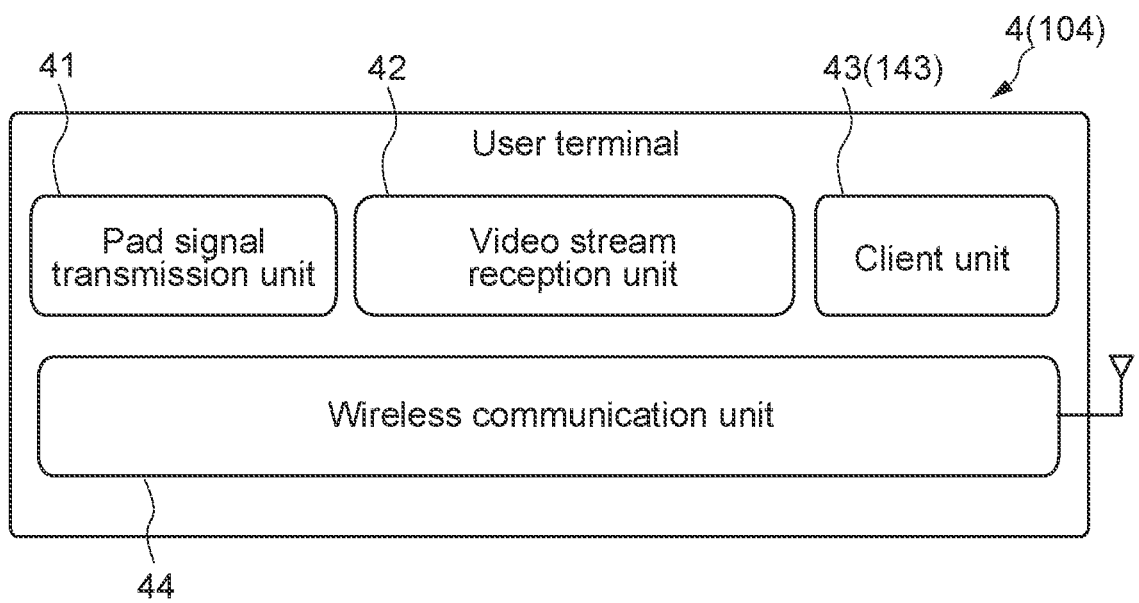
FIG. 4 shows an example of capability information stored in the storage unit of the data center.
FIG. 5 shows an example of network information stored in the storage unit of the data center.
FIG. 6 shows an example of cost information stored in the storage unit of the data center.
FIG. 7 is a functional block diagram of a user terminal constituting part of the information processing system according to the first and second embodiments.

FIG. 2 is a functional block diagram of the data center 3. FIG. 3 shows an example of scene information (reference symbol 521 in FIG. 2) stored in a storage unit 52 described below of the data center 3. FIG. 4 shows an example of capability information (reference symbol 72 in FIG. 2) stored in a storage unit 7 described below of the data center 3. FIG. 5 shows an example of network information (reference symbol 73 in FIG. 2) stored in the storage unit 7 of the data center 3. FIG. 6 shows an example of cost information (reference symbol 71 in FIG. 2) stored in the storage unit 7 of the data center 3.

As shown in FIG. 2, the data center 3 includes a plurality of instances 5, the storage unit 7, an API (Application Programing Interface) server unit 8, a telemetry unit 9, and a virtualization platform unit 10.

The virtualization platform unit 10 generates the instance 5 that is a virtual machine. The virtualization platform unit 10 is, for example, a virtual machine platform such as Open Stack (registered trademark) or a container platform such as docker/k8s (docker is a registered trademark.).

The instance 5 includes a game application unit 51 and the storage unit 52. The instance 5 is a game server that executes a game service.

The game application unit 51 is a game application executed by the instance 5. Hereinafter, an instance that executes a game application will be referred to as a game instance in some cases.

The game application unit 51 includes a logic unit 511, a video stream transmission unit 512, and a pad signal reception unit 513.

The pad signal reception unit 513 receives a pad signal input by a game pad of the user terminal 4 by a game player. In other words, the pad signal is an input operation signal acquired by an input operation on the user terminal 4 by a game player. The pad signal reception unit 513 takes out an input from a pad signal stored in the payload of a protocol such as a UDP (User Datagram Protocol) and a TCP (Transmission Control Protocol) and passes the input to the logic unit 511.

The logic unit 511 performs determination/processing according to the game on the basis of the pad signal received by the pad signal reception unit 513. The logic unit 511 stores, in the storage unit 52 described below, information 522 regarding the internal state (hereinafter, referred to as the internal information.) that changes depending on the pad signal or the progress of the game and scene information 521. The scene information 521 includes game title information of the game being played and the current game scene information. The game scene is, for example, an opening scene, a setting (config) scene, a battle scene, a video scene, or an ending scene. The internal information 522 can be copied to a storage unit of another instance in which the same game application is operated. As a result, a game application can be restarted by another instance.

The video stream transmission unit 512 generates a video stream of a game on the basis of the output of the logic unit 511 and transmits the video stream to the user terminal 4. More specifically, the video stream transmission unit 512 renders an image on the basis of the output of the logic unit 511, encodes the image by H.264, H.265, or the like, stores the encoded image in the payload of a protocol such as an RTP (Real-Time Transport Protocol), and transmits it to the user terminal 4. Further, the video stream transmission unit 512 changes the parameter relating to encoding, e.g., a bit rate and a frame rate, on the basis of the reception quality stored in the payload of a protocol such as an RTCP (Real-Time Transport Control Protocol) received from the user terminal 4.

The storage unit 52 stores the internal information 522 that changes depending on the determination/processing based on the pad signal and the progress of the game.

Further, the storage unit 52 stores, for example, the scene information 521 including the game title information and the current game scene information as shown in FIG. 3.

Note that a case where the logic unit 511, the video stream transmission unit 512, and the pad signal reception unit 513 that constitute the game application unit 51 are executed by a single instance 5 is illustrated in the description using FIG. 2, but they may be executed across the plurality of instances 5 and the plurality of data centers 3.

The telemetry unit 9 acquires, for each instance 5, measurement results such as a communication delay time with the user terminal 4 and a band width, and stores the measurement results as network information in the storage unit 7 described below.

The telemetry unit 9 acquires capability information relating to machine resources of the instance that can be provided by the data center 3 and stores the capability information in the storage unit 7.

The telemetry unit 9 acquires, for each instance 5, cost information necessary for using the instance 5 and stores the cost information in the storage unit 7.

The storage unit 7 stores, for example, capability information relating to the machine resources of the instance 5 that can be provided as shown in FIG. 4. Examples of the machine resources include a CPU (Central Processing Unit), a memory, and a GPU (Graphics Processing Unit). In FIG. 4, v-instance1 indicates a virtual instance 1, v-instance2 indicates a virtual instance 2, and these correspond to the plurality of instances 5 of the data center 3. As shown in FIG. 4, the number of cores of vCPU (virtual CPU), the capacity of v Memory (virtual Memory), and the number of cores of vGPU (virtual GPU) for each instance 5 are stored as capability information in the storage unit 7.

Further, the storage unit 7 stores, for example, network information for each instance 5 as shown in FIG. 5. The network information is information relating to the communication resources between the instance 5 and the user terminal 4. The network information includes throughput information and communication delay information.

The throughput indicates the amount of data that can be transmitted/received per unit time via the mobile network 6 and represents the data transmission capacity. In FIG. 5, the throughput information is shown using a bandwidth. The bandwidth means the communication speed used for communication. The larger the numerical value of the bandwidth, the larger the amount of information that can be transferred per unit time.

The communication delay time (latency) that is communication delay information represents the delay time of communication that occurs from the time when a transfer request was issued to when data was actually sent.

As shown in FIG. 5, for each instance 5, network information with the user terminal 4 is stored. The latency and the bandwidth can be updated by acquiring measurement results at any time by the telemetry unit 9. The network information represents the communication performance with the user terminal 4 in the data center 3.

Note that although details of a case where the information processing system 1 includes a plurality of user terminals 4 will be described in the second embodiment described below, the storage unit 7 of each data center 3 stores network information of each instance for each of the plurality of user terminals 4 as shown in FIG. 5.

Further, the storage unit 7 stores, for example, cost information for each instance 5 as shown in FIG. 6. Examples of the cost information include the usage fee of the instance 5 per unit time, the communication fee when the data center 3 receives data from the outside (inbound), and the communication fee when the data center 3 transmits data to the outside (outbound).

Note that the cost information may be fixed, may be variably set, and may be appropriately set in accordance with how the system is assembled. For example, the cost information may be set to fluctuate, e.g., the usage fee increases with an increase in the demand for an instance.

A method of implementing the storage unit 7 in a relational database management system such as SQL (Structured Query Language) is conceivable, but is not particularly limited.

The API server unit 8 provides an API for causing the virtualization platform unit 10 to start a game instance. The API is for disclosing, to the orchestrator 2, scene information including a game title and a game scene of a game being played, and capability information, network information, and cost information of the instance 5. The method of implementing the API is not particularly limited, and the API can be implemented in, for example, a REST API format. The REST API is an API implemented in accordance with the concept of the REST (Representational State Transfer).

(Configuration of User Terminal)

FIG. 7 is a functional block diagram of the user terminal 4.

As shown in FIG. 7, the user terminal 4 includes a pad signal transmission unit 41, a video stream reception unit 42, a client unit 43, and a wireless communication unit 44.

The user terminal 4 includes a game pad (not shown) that accepts an input operation of a game player and a display unit (not shown). A game image and the like are displayed on the display unit. Note that the display unit and a game controller having the game pad may be on separate devices. Further, although an example in which the form for accepting an input operation is a game pad has been given, the present technology is not limited thereto and a touch panel or the like may be used.

The wireless communication unit 44 transmits/receives data to/from the data center 3 via the mobile network 6.

The pad signal transmission unit 41 transmits, to the data center 3 via the wireless communication unit 44, a pad signal (referred to as an input operation signal in some cases.) relating to the input from a game pad implemented by software or hardware. The pad signal transmission unit 41 stores the pad signal from the game pad in the payload of a protocol such as a UDP (User Datagram Protocol) and a TCP (Transmission Control Protocol).

The video stream reception unit 42 receives a video stream from the instance 5 of the data center 3 via the wireless communication unit 44. The video stream reception unit 42 decodes the video stream encoded by H.264, H.265, or the like stored in the payload of a protocol such as an RTP. Further, the video stream reception unit 42 stores the reception quality of the video stream in the payload of a protocol such as an RTCP (Real-time Transport Control Protocol) and feeds it back to the instance 5. The decoding result is displayed as a game image or the like on the display unit.

The client unit 43 is in charge of starting and stopping an instance. The client unit 43 transmits, to the orchestrator 2, an instance start instruction or stop instruction for starting or stopping the instance 5 in accordance with an input operation by a game player. The instance start instruction or stop instruction includes at least information of a game identifier for identifying games different from each other, such as a title of a game. In this embodiment, the protocol for this is not particularly limited, but can be implemented by, for example, a REST API format.

(Configuration of Orchestrator)

Figures 8, 9, 10:
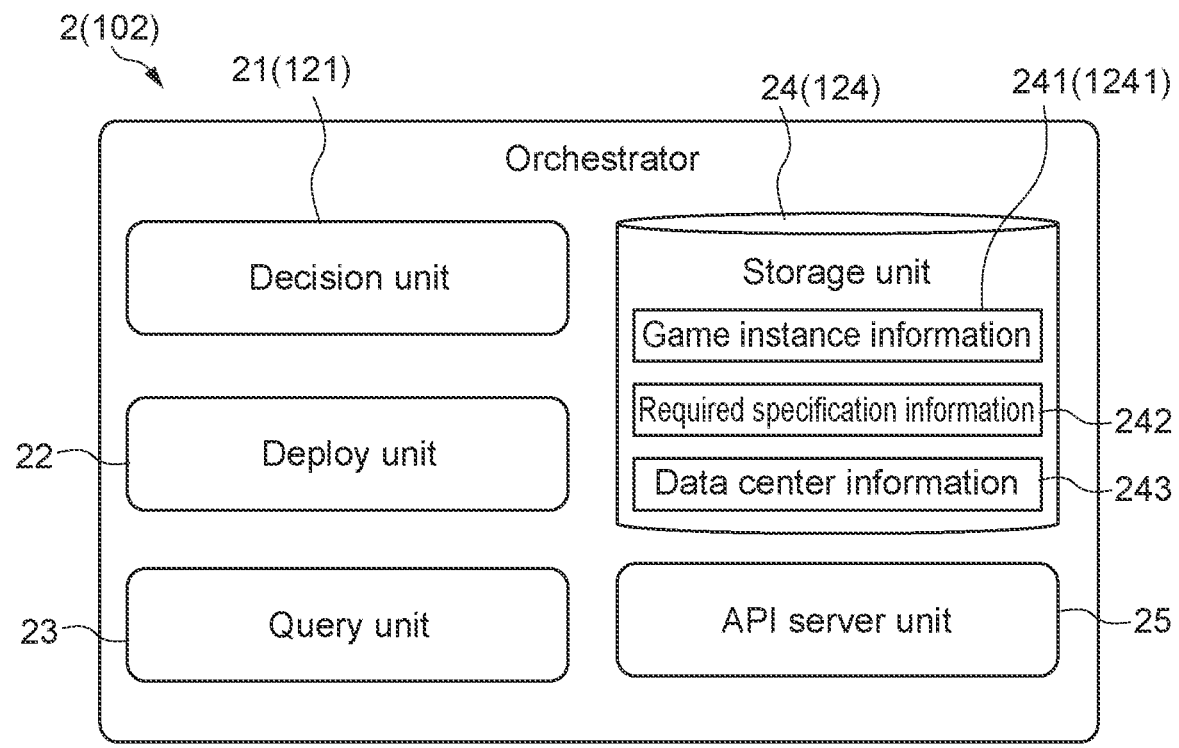
FIG. 8 is a functional block diagram of an orchestrator constituting part of the information processing system according to the first and second embodiment.
FIG. 9 shows an example of game instance information stored in a storage unit of the orchestrator of the information processing system according to the first embodiment.
FIG. 10 shows an example of data center information stored in a storage unit of the orchestrator.

FIG. 8 is a functional block diagram of the orchestrator 2 as an information processing apparatus. FIG. 9 shows an example of game instance information (reference symbol 241 in FIG. 8) stored in a storage unit 24 of the orchestrator 2. FIG. 10 shows an example of data center information (reference symbol 243 in FIG. 8) stored in the storage unit 24. FIG. 11 shows an example of required specification information (reference symbol 242 shown in FIG. 8) stored in the storage unit 24.

As shown in FIG. 8, the orchestrator 2 includes a decision unit 21, a deploy unit 22, a query unit 23, the storage unit 24, and an API server unit 25. The orchestrator 2 selects and determines, on the basis of various types of information, the data center 3 that executes a game application.

The storage unit 24 stores game instance information 241, required specification information 242, and data center information 243.

As shown in FIG. 9, the game instance information 241 includes a game player identifier such as a user ID of a game service and an identifier of an instance corresponding to the game player identifier.

As shown in FIG. 10, the data center information 243 includes a list of the instances 5 of each data center 3. The list can be said to be a list of data center candidates that execute a game application.

As shown in FIG. 11, the required specification information 242 is required specification information necessary for executing an application of each scene of each game. The specification information includes the number of cores of vCPU, the capacity of vMemory, the number of cores of vGPU, the target latency, the bandwidth, and the like. As shown in FIG. 11, the specification information to be required differs for each game title and each scene such as opening, setting, battle, and movie.

Further, the storage unit 24 stores a program relating to a series of processes for determining the data center that executes an application.

The program causes the orchestrator 2 to execute the step of acquiring capability information and network information from each of a plurality of data centers and the step of determining, on the basis of the capability information, the network information, and the required specification information necessary for executing an application, a data center having an instance that executes an application to be used by a user terminal from the plurality of data centers.

The query unit 23 acquires various types of information from the data centers 3 listed in the data center information 243.

Specifically, the query unit 23 requests each of the data centers 3 for various types of information. The query unit 23 acquires capability information 72, network information 73, and cost information 71 of each instance 5, and the scene information 521 in the case where the instance 5 is being executed, as various types of information via the API server unit 8 of each of the data centers 3.

The API server unit 25 receives the instance start instruction or stop instruction transmitted from the client unit 43 of the user terminal 4.

The decision unit 21 selects and determines, using the reception of an instance start instruction or stop instruction by the API server unit 25 as a trigger, the data center 3 and the instance 5 that should execute a game application using the required specification information and the capability information, the network information, and the cost information acquired by the query unit 23.

Further, the decision unit 21 selects and determines, using a change in the information acquired by the query unit 23 as a trigger, the data center 3 and the instance 5 that should execute a game application using the required specification information, the scene information, the capability information, the network information, and the cost information.

The change in information acquired by the query unit 23 is a change in at least one piece of information of the capability information 72, the network information 73, the cost information 71, and the scene information 521. For example, it is a change in the scene information 521 from an opening scene to a battle scene.

The algorithm and the like for determining the data center 3 are not particularly limited. For example, the cost can be reduced by assigning an instance that is just enough for the required specification information. In the case of the required specification information illustrated in FIG. 11, since the target latency in an opening scene is longer than those in a setting scene and a battle scene, an operation of selecting the instance 5 of the data center 3 with a low cost while satisfying the required specifications on the basis of the capability information, the network information, and the cost information is performed as an example.

The decision unit 21 periodically acquires scene information via the API server unit 8 of the data center 3 that executes an instance listed in the game instance information 241 shown in FIG. 9 and performs processing of determining the instance 5 in accordance with the change in scene information. Alternatively, the decision unit 21 performs processing of determining the instance 5 in accordance with an event-driven change in scene information. For example, when transitioning from an opening scene to a battle scene, in the case of the required specification information illustrated in FIG. 11, the target latency of the battle scene is smaller than the target latency of the opening scene. In such a case, an operation of selecting the instance 5 of the data center 3 closer to the user terminal 4 as the instance 5 that executes an application on the basis of the capability information, the network information, and the cost information and switching the instance to the selected instance 5 is performed as an example.

The deploy unit 22 starts and stops the instance 5 and changes the instance 5 on the basis of the determination result in the decision unit 21 and sets a path from the user terminal 4 to the instance 5 via an NEF (Network Exposure Function) described below.

(Configuration of Mobile Network)

Figure 12:
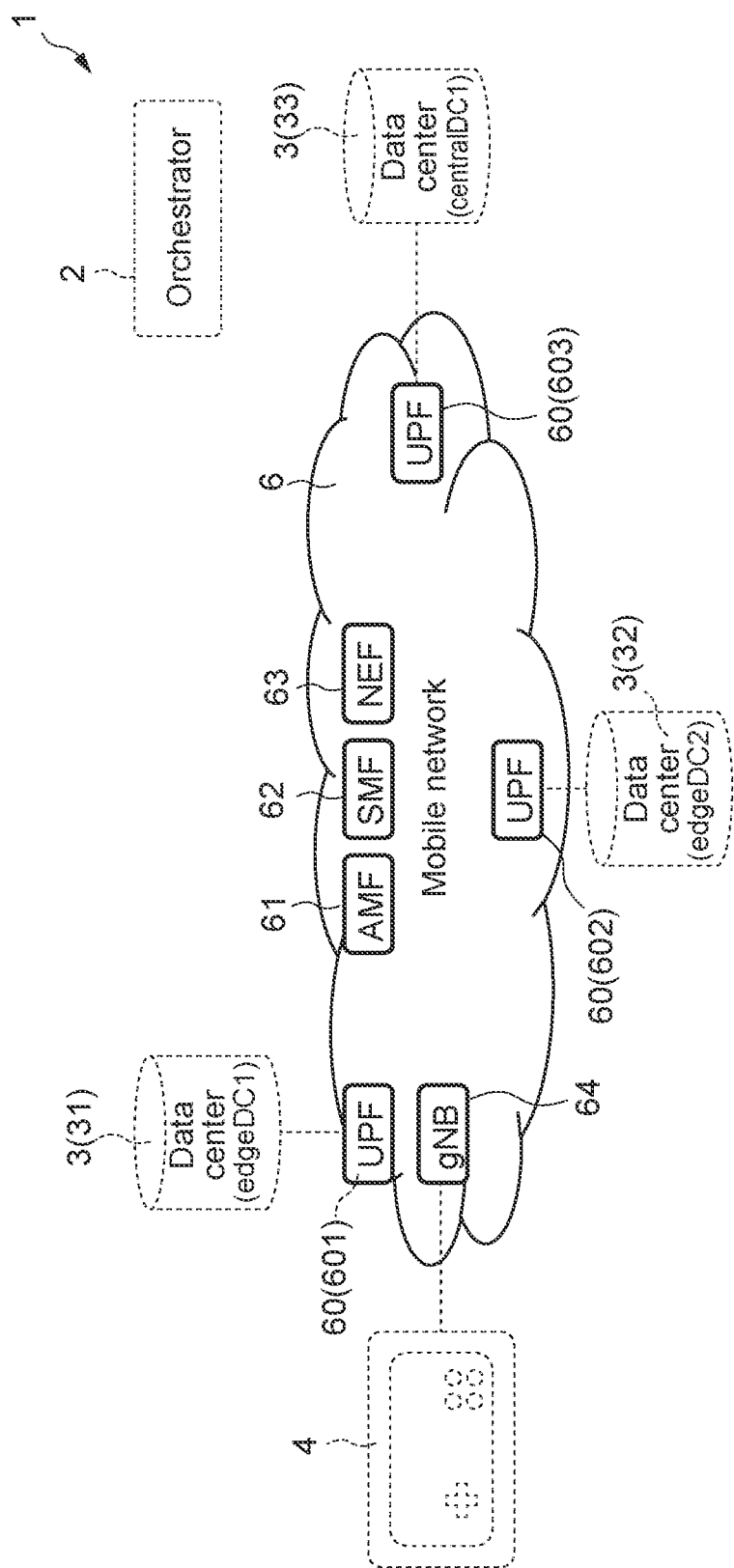
FIG. 12 is a configuration diagram of a mobile network constituting part of the information processing system according to the first and second embodiments.

FIG. 12 is a configuration diagram of the mobile network 6.

The mobile network 6 is, for example, a network defined by the third generation partnership project (3GPP).

The mobile network 6 is configured to include a UPF (User Plane Function) 60, an AMF (Access and Mobility Management Function) 61, an SMF (Session Management Function) 62, an NEF (Network Exposure Function) 63, and a gNB (wireless base station that provides NR (New Radio) wireless) 64. Each of the data centers 31 to 33 is connected to the mobile network 6 via different UPFs 601 to 603 (described with a reference symbol 60 when they are not distinguished from each other.) provided corresponding to the data centers 31 to 33. The NEF 63 sets, on the basis of an instruction from the orchestrator 2, the SMF 62 to forward the game traffic to the corresponding UPF 60. The gNB 64 and the UPF 60 bidirectionally transmit/receive information to/from each other. The user terminal 4 and gNB 64 bidirectionally transmit/receive information to/from each other.

[Information Processing Method]

An information processing method relating to a series of processes for determining a data center that executes a game application in the information processing system 1 will be described. In the following, the information processing method at the start of a game, during the game, and at the stop of the game will be described.

Figure 13:
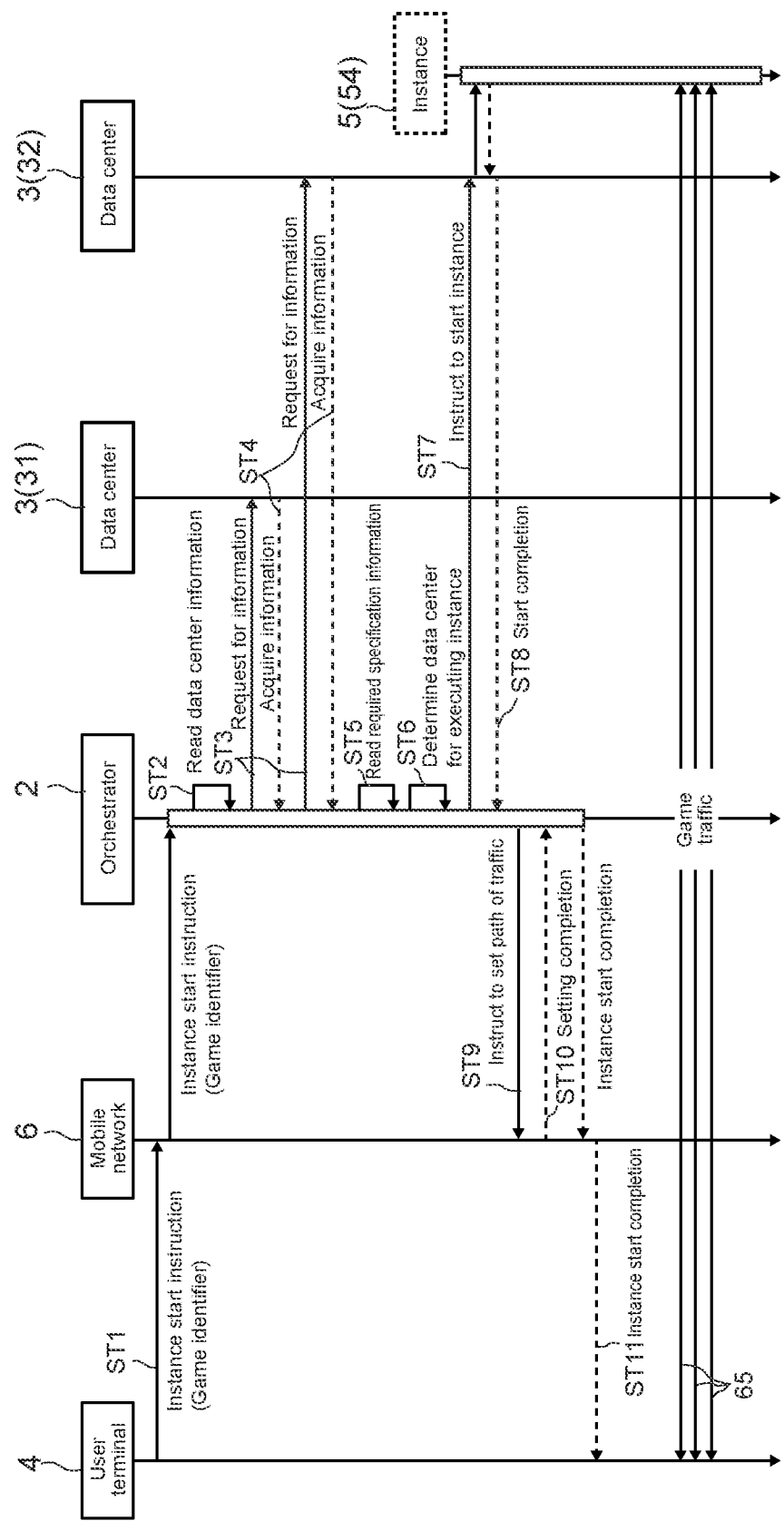
FIG. 13 is an operation flow diagram at the start of a game in the information processing system according to the first embodiment.

FIG. 13 is an operation flow diagram at the start of a game in the information processing system 1.

Figure 14:
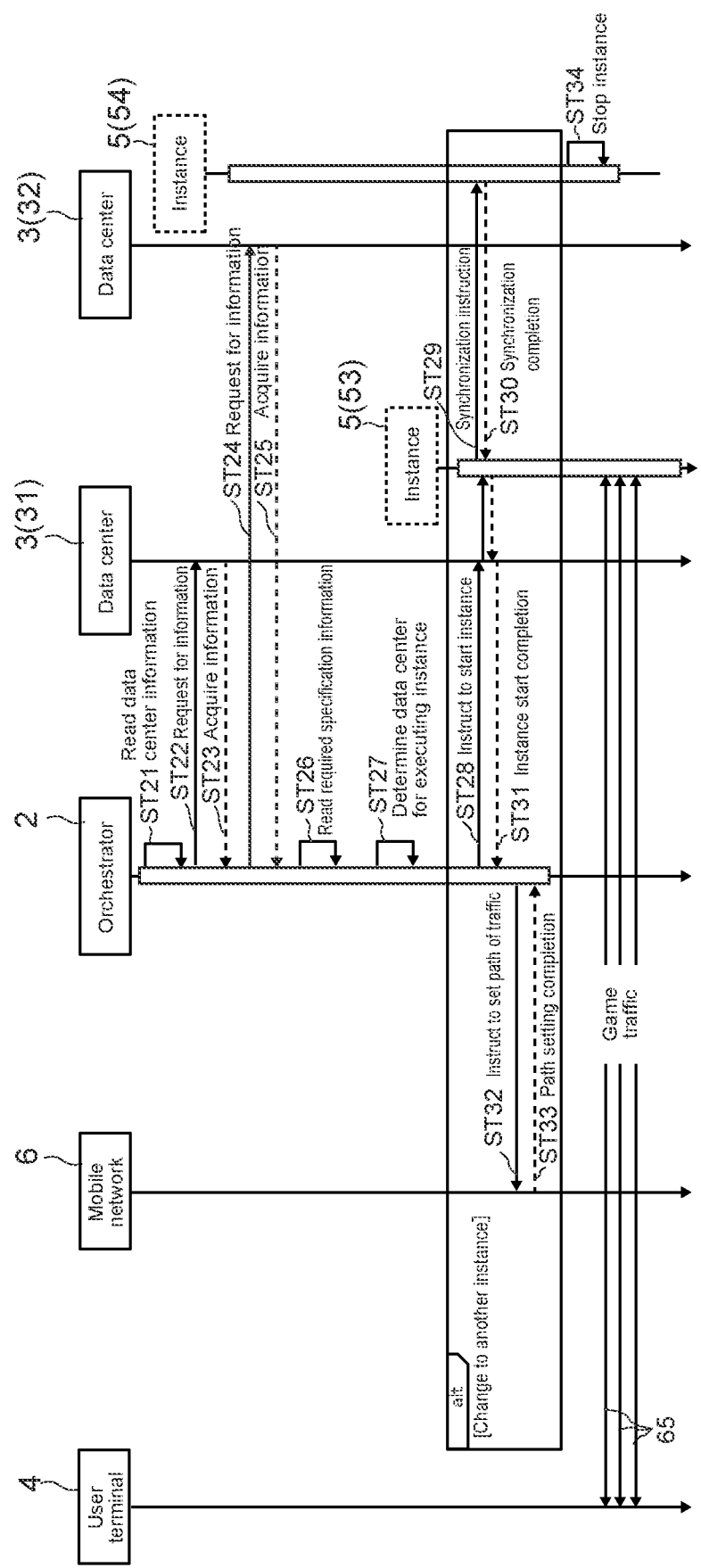
FIG. 14 is an operation flow diagram during a game in the information processing system according to the first embodiment.

FIG. 14 is an operation flow diagram during the game in the information processing system 1.

Figure 15:
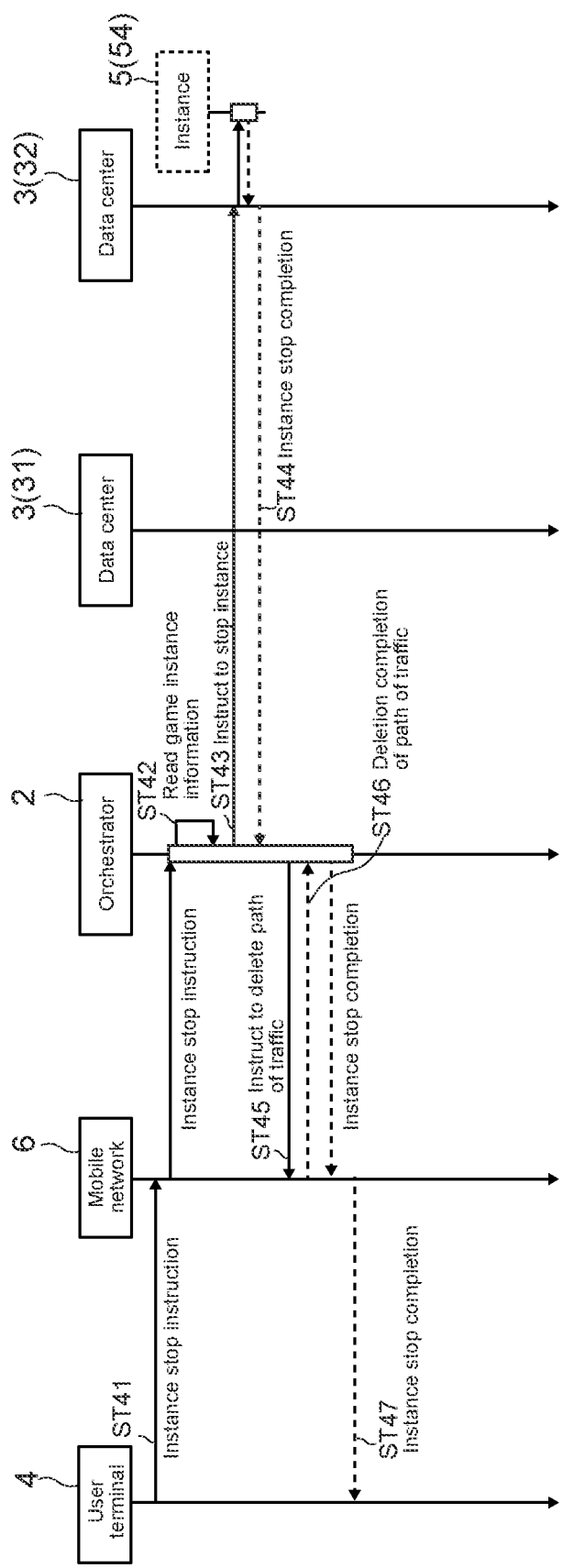
FIG. 15 is an operation flow diagram at the stop of the game in the information processing system according to the first embodiment.

FIG. 15 is an operation flow diagram at the stop of the game in the information processing system 1.

FIGS. 13 to 15 illustrate a case where the number of data centers 3 is two for convenience. The two data centers 3 are referred to as a data center 31 and a data center 32. Further, an instance of the data center 31 is denoted by a reference symbol 53 and an instance of the data center 32 is denoted by a reference symbol 54. Note that these instances are referred to as the instance 5 when it is particularly unnecessary to distinguish them from each other. The same applies also to the second embodiment described below.

(Operation at Start of Game)

FIG. 13 is an operation flow diagram at the start of a game.

As shown in FIG. 13, when a game player performs a start input operation of game play in the user terminal 4, an instance start instruction is transmitted from the client unit 43 of the user terminal 4 to the orchestrator 2 via the mobile network 6 (ST1). The instance start instruction includes information of a game identifier.

Next, the query unit 23 of the orchestrator 2 reads data center information shown in FIG. 10 from the storage unit 24 (ST2).

Next, the query unit 23 of the orchestrator 2 requests the data center 3 for the capability information 72, the network information 73, and the cost information 71 (ST3). The query unit 23 acquires the capability information 72, the network information 73, and the cost information 71 shown in FIGS. 4 to 6 from each of the data centers 31 and 32 (ST4). These pieces of information are each the latest information.

Next, the decision unit 21 of the orchestrator 2 reads the required specification information 242 shown in FIG. 11 from the storage unit 24 (ST5).

Next, the decision unit 21 of the orchestrator 2 selects and determines an instance of a data center that executes a game application (ST6). More specifically, the decision unit 21 determines an instance using the required specification information 242, the capability information 72, the network information 73, and the cost information 71.

Although a specific example of determining an instance of a data center will be described below, the present technology is not limited thereto. Here, assumption is made that a game scene is an opening scene because an operation at the start of a game is described.

The decision unit 21 acquires, on the basis of a game identifier, the specification information necessary for executing an opening scene of a game application corresponding to the game identifier from the read required specification information.

Next, the decision unit 21 selects an instance that satisfies the required specification information 242 using the capability information 72 and the network information 73 acquired from each of the data centers 3, and determines the selected instance as an instance that executes a game application. As a result, an instance that is just enough for the required specification information is assigned. Here, in the case where a plurality of instances has been selected, the decision unit 21 selects, for example, the instance 5 having the lowest cost using the cost information 71 and determines the selected instance 5 as an instance that executes a game application. As a result, it is possible to assign an instance that is just enough for the required specification information at a low cost.

As described above, the decision unit 21 determines the instance 5, i.e., the data center 3 having the instance 5 is determined. In the example shown in FIG. 13, the instance 54 of the data center 32 is selected and determined as an instance that executes an application.

Next, the deploy unit 22 of the orchestrator 2 instructs the determined data center 32 to start an instance (ST7). The instance 54 of the data center 32 is started on the basis of the instruction.

When receiving notification of start completion of the instance 54 (ST8), the deploy unit 22 sets a path of a game traffic 65 between the user terminal 4 and the instance 54 via the NEF 63 of the mobile network 6 (ST9). When the path setting is completed (ST10), the deploy unit 22 notifies, via the mobile network 6, the user terminal 4 of the start completion of the instance 54 (ST11). In this way, the path of the game traffic 65 between the user terminal 4 and the instance 5 is set.

As described above, an instance is automatically determined by the orchestrator 2 as an information processing apparatus using the required specification information, the capability information, the network information, and the cost information. As a result, an appropriate instance is assigned to the user terminal 4.

(Operation Flow During Game)

FIG. 14 is an operation flow diagram during a game. Here, an example in which execution of an application is changed from the instance 54 of the data center 32 to the instance 53 of the data center 31.

As shown in FIG. 14, the instance 54 of the data center 32 is executing an application.

The query unit 23 of the orchestrator 2 reads, from the storage unit 24, the game instance information shown in FIG. 9 and the data center information shown in FIG. 10 (ST21).

Next, the query unit 23 of the orchestrator 2 requests the data center 31 that is not executing an application for capability information, network information, and cost information (ST22). The query unit 23 of the orchestrator 2 acquires, from the data center 31, the capability information 72, the network information 73, and the cost information 71 respectively shown in FIGS. 4 to 6 (ST23). These pieces of information are each the latest information.

Next, the query unit 23 of the orchestrator 2 requests the data center 32 that is executing an application for scene information, capability information, network information, and cost information (ST24). The query unit 23 of the orchestrator 2 acquires, from the data center 32, the scene information 521, the capability information 72, the network information 73, and the cost information 71 respectively shown in FIGS. 3 to 6 (ST25). These pieces of information are each the latest information.

Next, the decision unit 21 of the orchestrator 2 reads, from the storage unit 24, the required specification information 242 shown in FIG. 11 (ST26).

Next, the decision unit 21 of the orchestrator 2 selects and determines an instance of a data center that executes a game application (ST27). More specifically, the decision unit 21 determines an instance using the required specification information 242, the capability information 72, the network information 73, and the cost information 71.

Although a specific example of determination of an instance of a data center will be described below, the present technology is not limited thereto. The decision unit 21 acquires, on the basis of a game identifier and scene information, the specification information necessary for executing a scene corresponding to the scene information of an application of a game title corresponding to the game identifier from the read required specification information.

Next, the decision unit 21 selects an instance that satisfies the required specification information 242 using the capability information 72 and the network information 73 acquired from each of the data centers 31 and 32 and determines the selected instance as an instance that executes a game application. As a result, an instance that is just enough for the required specification information is assigned. Here, in the case where a plurality of instances has been selected, the decision unit 21 selects, for example, an instance having the lowest cost using the cost information 71 and determines the selected instance as a game instance that executes an application. As a result, it is possible to assign an instance that is just enough for the required specification information at a low cost.

In the example shown in FIG. 14, the decision unit 21 determines the instance 53 as a game instance that executes an application. That is, the decision unit 21 determines the data center 31 having [the instance 53 as a data center that executes an application.

Here, in the case where the instance 54 of the data center 32 has been determined as a game instance that executes an application, i.e., in the case where there is no change in the instance, the processing returns to Step 21 (ST21) and processing is repeated.

Meanwhile, in the case where an instance changes as in the example shown in FIG. 14, the processing proceeds to Step 28.

Next, the deploy unit 22 of the orchestrator 2 instructs the determined data center 31 to start an instance (ST28). Next, the instance 53 instructs the instance 54 of the data center 32 that has executed a game application to synchronize internal information (ST29), and internal information is acquired from the instance 54 to complete the internal information synchronization (ST30). The instance 53 is started by the synchronization completion of internal information.

When receiving notification of start completion of the instance 53 (ST31), the deploy unit 22 sets a path of the game traffic 65 between the user terminal 4 and the instance 5 via the NEF 63 of the mobile network 6 (ST32). Here, the path is set to be changed from the path of a game traffic between the user terminal 4 and the instance 54 to the path of a game traffic between the user terminal 4 and the instance 53.

The deploy unit 22 receives notification of the path setting completion (ST33). As a result, the path of the game traffic 65 between the user terminal 4 and the instance 5 is changed.

In the data center 32, the instance 54 is stopped by the synchronization completion of internal information (ST34).

As described above, in the case where at least one of the capability information, the network information, the cost information, and the scene information has changed during the game, the orchestrator 2 automatically selects and determines an instance that executes a game application again using required specification information, scene information, capability information, network information, and cost information. As a result, an appropriate instance is assigned to the user terminal 4 and the game is continued.

(Operation at Stop of Game)

FIG. 15 is an operation flow diagram at the stop of a game. Here, an example in which the instance 54 of the data center 32 is executing an application first will be described.

When a game player performs a stop input operation of game play in the user terminal 4, an instance stop instruction is transmitted from the client unit 43 of the user terminal 4 to the orchestrator 2 via the mobile network 6 (ST41).

Next, the query unit 23 of the orchestrator 2 reads, from the storage unit 24, the game instance information shown in FIG. 9 (ST42). The query unit 23 of the orchestrator 2 specifies the instance 5 corresponding to the user terminal 4 on which a stop input operation has been performed. In the example shown in FIG. 15, the query unit 23 specifies the instance 54 of the data center 32.

Next, the deploy unit 22 of the orchestrator 2 instructs the data center 32 that executes the instance 54 to stop the instance 54 (ST43). The instance 54 of the data center 32 is stopped on the basis of the instruction.

When receiving notification of stop completion of the instance 54 (ST44), the deploy unit 22 deletes the path of the game traffic 65 between the user terminal 4 and the instance 54 (ST45). When the deletion of the path is completed (ST46), the deploy unit 22 notifies, via the mobile network 6, the user terminal 4 of stop completion of the instance 54 (ST47). The user terminal 4 receives notification of the instance stop completion and the game play is stopped.

As described above, in accordance with the first embodiment, it is possible to dynamically set an instance that executes a game application using required specification information, scene information, capability information, network information, and cost information and use an edge data center and a central data center separately. As a result, it is possible to satisfy the communication performance necessary for a game service at a low cost and strike a good balance between the experience quality of a game and the cost.

Second Embodiment

Although a so-called single user mode in which the number of game players who own a user terminal is one has been taken as an example in the first embodiment, the present technology may be applied to a multi-user mode in which a plurality of game players plays the same game.

In the second embodiment, a case where there is a plurality of game players, i.e., a case where there is a plurality of user terminals, will be described below. A basic configuration in the information processing system is similar to that in the first embodiment, similar configurations are denoted by similar reference symbols, and description thereof is omitted in some cases. Hereinafter, differences from the first embodiment will be mainly described.

[Schematic Configuration of Information Processing System]

Figure 16:
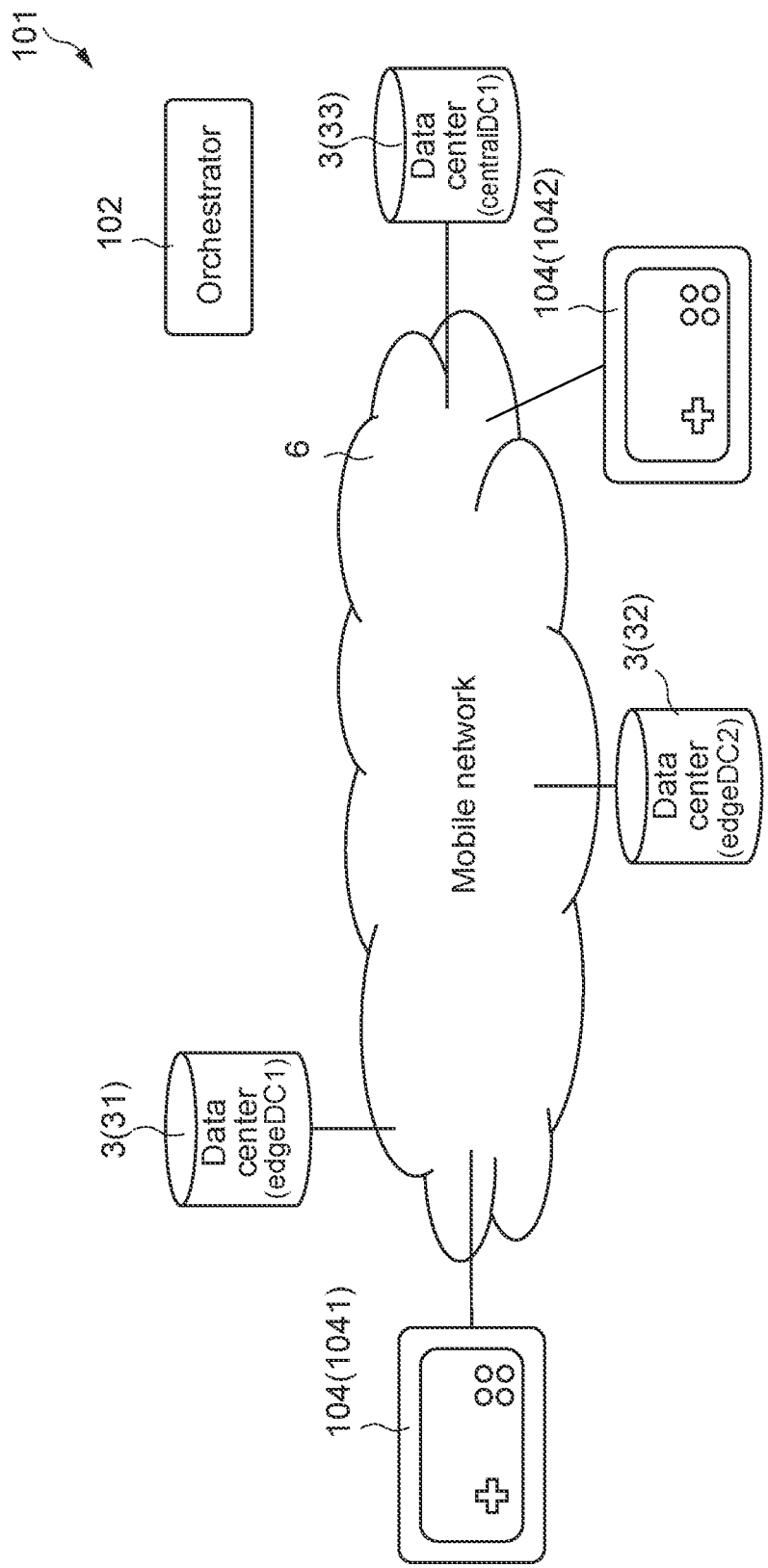
FIG. 16 is a configuration diagram of the information processing system according to the second embodiment.

FIG. 16 is a configuration diagram of an information processing system 101 according to this embodiment.

As shown in FIG. 16, the information processing system 101 includes an orchestrator 102 as an information processing apparatus, the plurality of data centers 3, a plurality of user terminals 104, and the mobile network 6.

Each of the data centers 3 executes various types of calculation processing constituting a game performed by a game player The orchestrator 102 selects and determines the data center 3 that executes a game from the plurality of data centers 3. The orchestrator 102 is configured to be capable of communicating with each of the user terminals 104 via the mobile network 6. The orchestrator 102 is configured to be capable of communicating with the data center 3. The orchestrator 102 is capable of dynamically switching the data center that executes a game application.

Note that although the number of data centers 3 is three in FIG. 16 for convenience, the present technology is not limited thereto. Further, although the number of game players is two, i.e., the number of user terminals 104 is two in FIG. 16 for convenience, the present technology is not limited thereto. The two game terminals 104 are denoted by reference symbols 1041 and 1042 in order distinguish them from each other, but are referred to as the user terminal 104 in the case where it is particularly unnecessary to distinguish them from each other.

Details will be described below.

Since the configurations of the data center 3 and the mobile network 6 are similar to those in the first embodiment, description thereof is omitted.

(Configuration of User Terminal)

FIG. 7 is a functional block diagram of the user terminal 104.

As shown in FIG. 7, the user terminal 104 includes the pad signal transmission unit 41, the video stream reception unit 42, a client unit 143, and the wireless communication unit 44.

The user terminal 104 includes, for example, a game pad that accepts an input operation of a game player and a display unit.

The wireless communication unit 44, the pad signal transmission unit 41, and the video stream reception unit 42 are similar to those in the first embodiment.

The client unit 143 is in charge of starting and stopping a game instance. The client unit 143 transmits an instance start instruction or stop instruction to the orchestrator 2 in order to start or stop the instance 5 in accordance with an input operation by a game player. The game instance start instruction or stop instruction includes, in addition to at least a game identifier, information regarding a game party identifier such as a name of a game party (hereinafter, referred to as the game party information in some cases.) in the case of a multi-user mode. In this embodiment, the protocol for this is not particularly limited, but can be implemented by, for example, a REST API format.

(Configuration of Orchestrator)

FIG. 8 is a functional block diagram of the orchestrator 102 as an information processing apparatus. FIG. 17 shows an example of game instance information (reference symbol 1241 in FIG. 8) stored in a storage unit 124 of the orchestrator 102.

As shown in FIG. 8, the orchestrator 102 includes a decision unit 121, the deploy unit 22, the query unit 23, the storage unit 124, and the API server unit 25. The orchestrator 102 selects and determines, on the basis of various types of information, the data center 3 that executes a game application. This will be described below. The deploy unit 22, the query unit 23, and the API server unit 25 are similar to those in the first embodiment.

The storage unit 124 stores game instance information 1241, the required specification information 242, and the data center information 243. The required specification information 242 and the data center information 243 are similar to those in the first embodiment.

As shown in FIG. 17, the game instance information 1241 includes a game player identifier (user ID) and a game party identifier (party ID) corresponding to the game player identifier. The game party identifier is, for example, a name of a game party.

Further, the storage unit 124 stores a program relating to a series of processes for determining a data center that executes an application.

The decision unit 121 determines, using reception of a game instance start instruction or stop instruction by the API server unit 25 as a trigger, the data center 3 and the instance 5 that should execute a game application using the required specification information, and the capability information, the network information, and the cost information acquired by the query unit 23.

Further, the decision unit 121 selects and determines, using a change in information acquired by the query unit 23 as a trigger, the data center 3 and the instance 5 that should execute a game application using the required specification information, the scene information, the capability information, the network information, and the cost information.

The change in information acquired by the query unit 23 is a change in at least one piece of information of the capability information 72, the network information 73, the cost information 71, and the scene information 521. For example, it is a change in the scene information 521 from an opening scene to a battle scene. Further, as another example, in the case where a game player is newly added to one party or a game player leaves the party, the network information 73 used for determining an instance that executes a game application changes.

The algorithm and the like for determining the data center 3 are not particularly limited. For example, in the case of a game service, it is desired to determine the instance 5 such that the maximum value of the communication delay between the user terminal 104 and the instance 5 is minimized for the user terminals 104 owned by all the game players in the same game party. As a result, the performance of the user terminal 104 owned by each game player is maximized and the fairness between the game players is maintained at the same time.

[Information Processing Method]

An information processing method according to a series of processes for determining a data center in the information processing system 101 will be described. In the following, the information processing method at the start of a game and at the stop of the game will be described.

Figure 18:
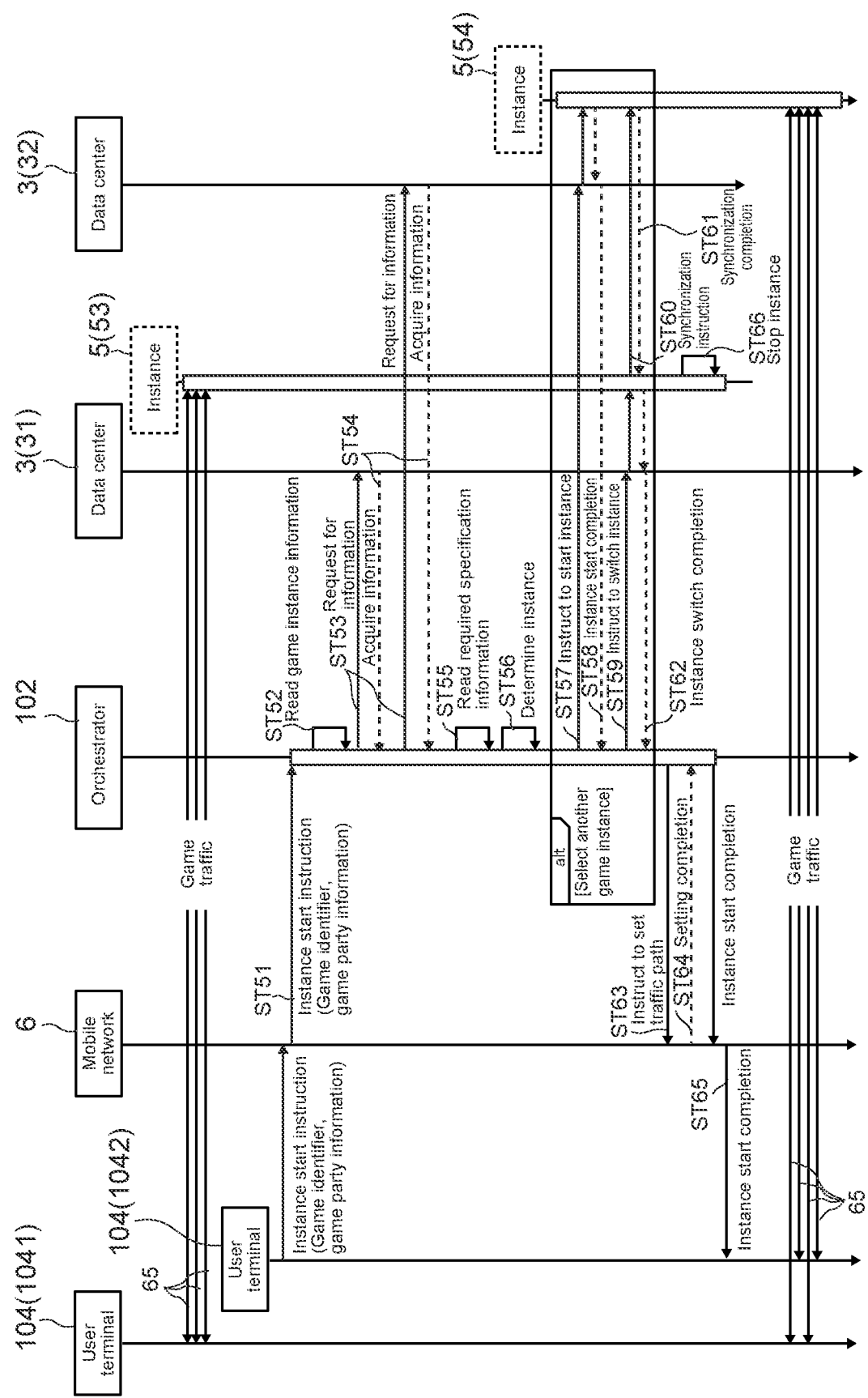
FIG. 18 is an operation flow diagram at the start of a game in the information processing system according to the second embodiment.

FIG. 18 is an operation flow diagram at the start of a game in the information processing system 101.

Figure 19:
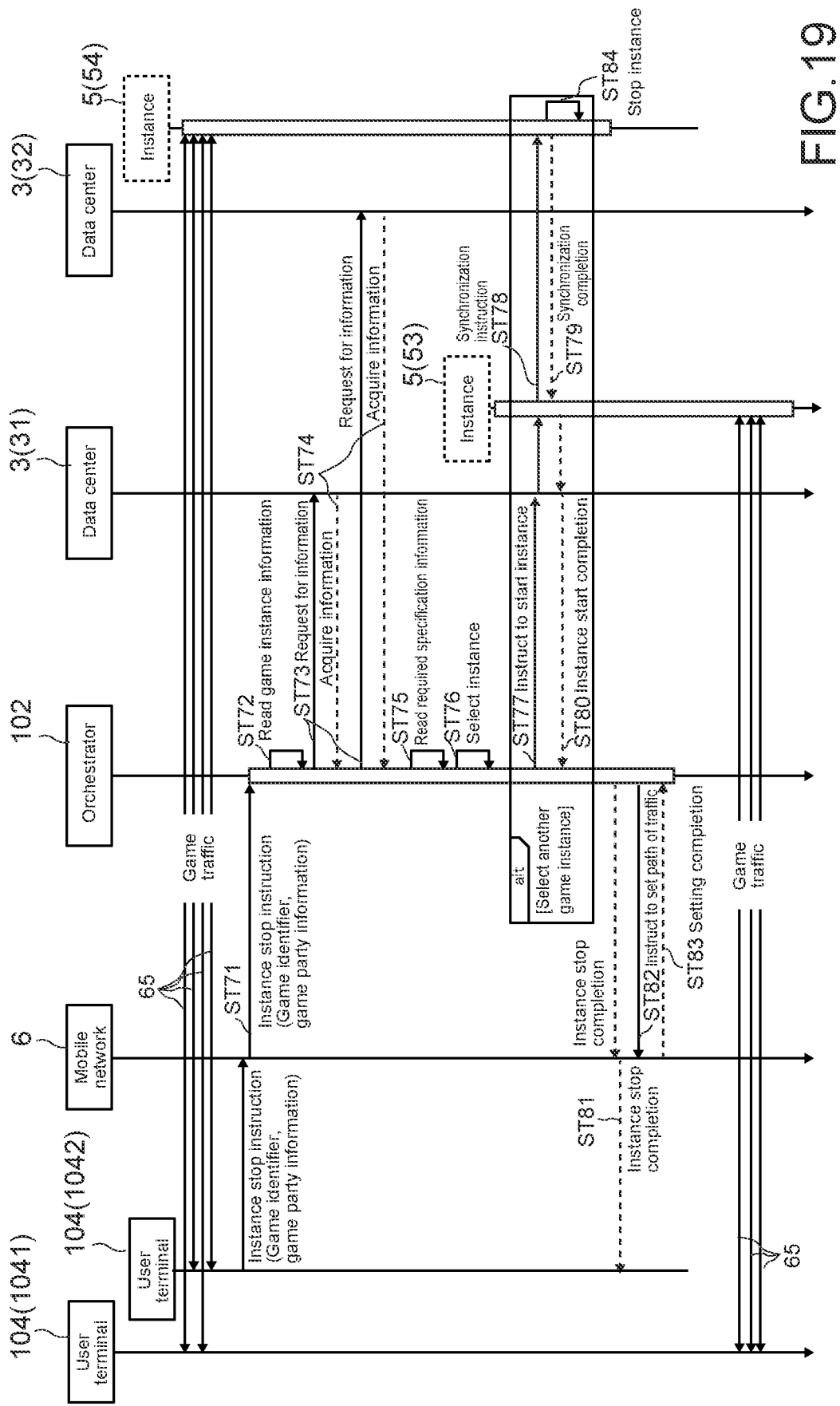
FIG. 19 is an operation flow diagram at the stop of the game in the information processing system according to the second embodiment.

FIG. 19 is an operation flow diagram at the stop of the game in the information processing system 101.

In FIG. 18 and FIG. 19, the number of data centers 3 is two and the number of user terminals 104 is two for convenience.

(Operation at Start of Game)

FIG. 18 is an operation flow diagram at the start of a game.

In the example shown in FIG. 18, a case where a game player who owns a user terminal 1041 has already participated in a game first and a game player who owns a user terminal 1042 participates in the same party in the game from the middle is shown. In FIG. 18, an example in which when the user terminal 1042 participates in the game from the middle, an instance that executes a game application is changed from the instance 53 to the instance 54 will be described.

Hereinafter, description will be made in accordance with the flow of FIG. 18.

As shown in FIG. 18, in the state where only the game player who owns the user terminal 1041 is participating the game, a path of the game traffic 65 is set between the user terminal 1041 and the instance 53 of the data center 31.

When the game player of the user terminal 1042 performs a start input operation of game play in the user terminal 1042, an instance start instruction is transmitted from the client unit 143 of the user terminal 1042 to the orchestrator 102 via the mobile network 6 (ST51). The instance start instruction includes game party information in addition to information regarding a game identifier.

Next, the query unit 23 of the orchestrator 102 reads the game instance information 1241 shown in FIG. 17 from the storage unit 124 (ST52).

Next, the query unit 23 checks, from the read game instance information, whether or not an instance corresponding to the game party information transmitted from the user terminal 1042 is started.

In the case where the instance corresponding to the game party information is not started, the same processing as that in Step 2 and subsequent Steps in the operation flow of FIG. 13 in the above-mentioned first embodiment is performed.

In the case where the instance corresponding to the game party information is started, the processing proceeds to Step 53. In the example shown in FIG. 18, since the instance 53 has already been started, the processing proceeds to Step 53.

Next, the query unit 23 of the orchestrator 102 requests each of the data centers 31 and 32 for capability information, network information, and cost information and further requests the data center 31 that is currently executing an application for scene information (ST53). The query unit 23 acquires, from each of the data centers 31 and 32, the capability information 72, the network information 73, and the cost information 71 respectively shown in FIGS. 4 to 6 and further acquires, from the data center 31, the scene information 521 shown in FIG. 3 (ST54). These pieces of information are each the latest information.

Next, the decision unit 121 of the orchestrator 102 reads, from the storage unit 124, the required specification information 242 shown in FIG. 11 (ST55).

Next, the decision unit 121 of the orchestrator 102 selects and determines an instance of a data center that executes a game application (ST56). More specifically, the decision unit 121 determines an instance using the scene information 521, the required specification information 242, the capability information 72, the network information 73, and the cost information 71.

Although a specific example of determination of an instance of a data center will be described below, the present technology is not limited thereto.

The decision unit 121 acquires, on the basis of a game identifier and scene information, the specification information necessary for executing a scene corresponding to the scene information of an application of a game title corresponding to the game identifier from the read required specification information.

Next, the decision unit 121 selects an instance that satisfies the required specification information 242 using the capability information 72 and the network information 73 acquired from each of the data centers 31 and 32. As a result, an instance that is just enough for the required specification information is assigned. Further, the decision unit 121 selects the instance 5 in which the maximum value of the communication delay between the user terminal 104 and the instance 5 is minimized for the user terminals 104 owned by all the game players in the game party and determines the selected instance 5 as an instance that executes an application. As a result, the performance of the user terminal 104 owned by each game player is maximized and the fairness between the game players can be maintained at the same time. Here, in the case where a plurality of instances has been selected, the decision unit 121 selects, for example, an instance having the lowest cost using the cost information 71 and determines the selected instance as a game instance that executes an application. As a result, it is possible to maximize the performance of the user terminal 104, maintain the fairness between the game players, and assign an instance having a low cost.

In the example shown in FIG. 18, the decision unit 121 determines the instance 54 of the data center 32 as an instance that executes a game application.

Here, in the case where there is no change in the instance in the determination result of the decision unit 121, the processing proceeds to Step 63.

Meanwhile, in the case where the instance changes as in the example shown in FIG. 18, the processing proceeds to Step 57.

Next, the deploy unit 22 of the orchestrator 102 instructs the determined data center 32 to start the instance 54 (ST57). The instance 54 is started on the basis of the instruction.

When receiving notification of start completion of the instance 54 (ST58), the deploy unit 22 instructs the instance 53 of the data center 31 to switch the instance (ST59).

Next, the instance 53 instructs the data center 32 that is the instance switching destination to synchronize internal information (ST60). In the instance 54 of the data center 32, the internal information is acquired from the instance 53 by receiving the synchronization instruction to complete the internal information synchronization. When receiving notification of the synchronization completion from the data center 32 (ST61), the data center 31 transmits notification of the instance switching completion to the orchestrator 2.

When receiving notification of the instance switching completion (ST62), the deploy unit 22 sets a path of the game traffic 65 between each user terminal 104 and the instance 5 via the NEF 63 of the mobile network 6 (ST63). Here, the path is set to be changed from the path of the game traffic between the user terminal 104 and the instance 53 to the path of the game traffic between the user terminal 104 and the instance 54.

When receiving notification of the path setting completion (ST64), the deploy unit 22 notifies the user terminal 1042 of instance start completion via the mobile network 6 (ST65). As a result, the path of the game traffic 65 is set.

As described above, in the case where a game player newly participates in the same party in the multiplayer mode, the orchestrator 102 automatically selects and determines an instance again using the required specification information, the scene information, the capability information, the network information, and the cost information. As a result, an appropriate instance is newly assigned to the user terminal 104, and it is possible to, for example, maximize the performance of the user terminal 104 owned by each game player and maintain the fairness between the game players at the same time.

(Operation Flow at Stop of Game)

FIG. 19 is an operation flow diagram at the stop of a game.

The example shown in FIG. 19 shows a case where a game player who owns the user terminal 1041 and a game player who owns the user terminal 1042 have participated in a game first and the game player who owns the user terminal 1042 stops the game in the middle. FIG. 19 shows an example in which an instance that executes a game application is changed from the instance 54 to the instance 53 due to the game stopping in the user terminal 1042.

As shown in FIG. 19, in the state where both the game players who own the user terminals 1041 and 1042 are participating in the game, the path of the game traffic 65 is set between the user terminal 104 and the instance 54 of the data center 32.

When the game player who owns the user terminal 1042 performs a stop input operation of game play in the user terminal 1042, an instance stop instruction is transmitted from the client unit 143 of the user terminal 1042 to the orchestrator 102 via the mobile network 6 (S71). The instance stop instruction includes game party information in addition to information regarding a game identifier.

Next, the query unit 23 of the orchestrator 102 reads the game instance information 1241 stored in the storage unit 124, which is shown in FIG. 17 (ST72).

Next, the query unit 23 checks, from the game instance information, whether or not another user terminal 104 is connected to the instance corresponding to the game party information transmitted from the user terminal 1042.

In the case where another user terminal 104 is not connected, the same processing as that in Step 3 and subsequent Steps in the operation flow of FIG. 13 in the above-mentioned first embodiment is performed.

In the case where another user terminal 104 is connected, the processing proceeds to Step 73. In the example shown in FIG. 19, since the user terminal 1041 that is another user terminal is connected, the processing proceeds to Step 73.

Next, the query unit 23 of the orchestrator 102 requests each of the data centers 31 and 32 for capability information, network information, and cost information, and further requests the data center 32 that is currently executing an application for scene information (ST73). The query unit 23 acquires, from each of the data centers 31 and 32, the capability information 72, the network information 73, and the cost information 71 respectively shown in FIGS. 4 to 6, and further acquires, from the data center 32, the scene information 521 shown in FIG. 3 (ST74).

Next, the decision unit 121 of the orchestrator 102 reads, from the storage unit 124, the required specification information shown in FIG. 11 (ST75).

Next, the decision unit 121 of the orchestrator 102 selects and determines the data center 3 and the instance 5 that execute a game application for the user terminals 104 owned by the remaining game players who have not performed a stop input operation in the game party (ST76).

Although a specific example of determination of an instance of a data center will be described below, the present technology is not limited thereto.

The decision unit 121 acquires, on the basis of a game identifier and scene information, the specification information necessary for executing a scene corresponding to the scene information of an application of a game title corresponding to the game identifier from the read required specification information.

Next, the decision unit 121 selects an instance that satisfies the required specification information 242 using the capability information 72 and the network information 73 acquired from each of the data centers 31 and 32. As a result, an instance that is just enough for the required specification information is assigned.

Further, in the case where there is a plurality of game players other than the game player of the user terminal 104 who has transmitted an instance stop instruction, the decision unit 121 selects the instance 5 in which the maximum value of the communication delay between the user terminal 104 and the instance 5 is minimized for the user terminals 104 owned by the plurality of game players and determines the selected instance 5 as an instance that executes an application. As a result, it is possible to maximize the performance of the user terminal 104 owned by each game player and maintain the fairness between the game players at the same time. Further, in the case where the number of game players other than the game player of the user terminal 104 who has transmitted an instance stop instruction is one, the decision unit 121 is capable of determining an instance by, for example, a method similar to that in the specific example of determination of an instance shown in the first embodiment.

In the example shown in FIG. 19, the instance 53 of the data center 31 has been selected and determined as a game instance that executes a game application after the game player of the user terminal 1042 stops the game. That is, an instance that is different from the instance that was executing a game application has been selected.

Here, in the case where there is no change in the instance in the determination result of the decision unit 121, the processing proceeds to Step 82.

Meanwhile, in the case where the instance changes as in the example shown in FIG. 18, the processing proceeds to Step 77.

Next, the deploy unit 22 of the orchestrator 102 instructs the determined data center 31 to start the instance 53 (ST77). Next, the instance 53 instructs the instance 54 of the data center 32 that was executing an application to synchronize internal information (ST78), and internal information is acquired from the instance 54 to complete the internal information synchronization (ST79). The instance 53 is started by the synchronization completion of internal information.

When receiving notification of start completion of the instance 53 (ST80), the deploy unit 22 notifies, via the mobile network 6, the user terminal 1042 of the stop completion of the instance 54 (ST81). In the user terminal 104, the notification of instance stop completion is received to stop the game play.

Next, the deploy unit 22 sets a path of the game traffic between the user terminal 104 and the instance 53 via the NEF 63 of the mobile network 6 (ST82). Here, the path is set to be changed from the path of the game traffic between the user terminal 104 and the instance 54 to the path of the game traffic between the user terminal 104 and the instance 53.

The deploy unit 22 receives notification of the path setting completion (ST83). As a result, the path of the game traffic 65 is set.

In the data center 32, the instance 54 is stopped by the synchronization completion of internal information (ST84).

As described above, in the case where the game player who was participating the same game party stops the game play in the multiplayer mode, the orchestrator 102 automatically selects and determines an instance again using the required specification information, the scene information, the capability information, the network information, and the cost information.

As a result, an appropriate instance is assigned to the user terminal 104. In the case where there is a plurality of game players remaining in the game party, it is possible to determine an instance such that, for example, the performance of the user terminal 104 owned by each game player is maximized and the fairness between the game players is maintained at the same time. Further, in the case where the number of game players remaining in the party is one, it is possible to, for example, assign an instance that is just enough for the required specification information to the remaining user terminal 104 at a low cost.

As described above, in accordance with the second embodiment, it is possible to suppress the difference in communication delay between the user terminal and the instance, which is generated for each game player. As a result, it is possible to strike a good balance between the experience quality of a game and the cost and maintain the fairness between the game players.

Embodiments of the present technology are not limited to the above-mentioned embodiments, and various modifications can be made without departing from the essence of the present technology.

For example, although an example in which an application is a game application has been described in the above-mentioned embodiments, the present technology is not limited thereto. Note that in the case of a game application, the required specification information, cost information, and the like differ depending on the game title and the game scene. Therefore, as in the above-mentioned embodiments, it is particularly effective to determine an appropriate instance taking into consideration the game title information and the game scene information, and it is possible to improve the user satisfaction without unnecessary cost.

It should be noted that the present technology may also take the following configurations.

(1) An information processing apparatus, including:
a decision unit that determines, on a basis of capability information of an instance that executes an application of a data center and network information relating to communication between a user terminal and the data center, which are acquired from each of a plurality of the data centers capable of communicating with the user terminal via a network, and required specification information necessary for executing the application, a data center having an instance that executes the application to be used by the user terminal from the plurality of data centers.

(2) The information processing apparatus according to (1) above, in which
the network information includes communication delay information, and
the plurality of data centers includes at least two data centers having pieces of communication delay information with the user terminal different from each other.

(3) The information processing apparatus according to (2) above, in which
the network information further includes throughput information.

(4) The information processing apparatus according to any one of (1) to (3) above, in which
the decision unit determines, using reception of a start instruction or a stop instruction from the user terminal or a change in the network information acquired from the data center as a trigger, a data center to be used by the user terminal from the plurality of data centers.

(5) The information processing apparatus according to any one of (1) to (4) above, in which
the application is a game application, and
the decision unit further takes into consideration game title information and game scene information of the game application to be executed to determine a data center to be used by the user terminal from the plurality of data centers.

(6) The information processing apparatus according to (5) above, in which
the required specification information is set in advance for each of a plurality of different game titles and a plurality of different game scenes.

(7) The information processing apparatus according to any one of (1) to (6) above, in which
the decision unit further takes into consideration cost information acquired from each of the plurality of data centers to determine a data center to be used by the user terminal from the plurality of data centers.

(8) The information processing apparatus according to any one of (1) to (7) above, in which
the user terminal includes a plurality of user terminals, and
the decision unit determines a data center to be used by the plurality of user terminals on a basis of the capability information and the network information for each of the plurality of user terminals, which are acquired from each of the plurality of data centers, and the required specification information.

(9) An information processing method, including:
acquiring capability information of an instance that executes an application of a data center and network information relating to communication between a user terminal and the data center, from each of a plurality of the data centers capable of communicating with the user terminal via a network; and
determining, on a basis of the capability information, the network information, and required specification information necessary for executing the application, a data center having an instance that executes the application to be used by the user terminal from the plurality of data centers.

(10) A program that causes an information processing apparatus to execute the steps of:
acquiring capability information of an instance that executes an application of a data center and network information relating to communication between a user terminal and the data center, from each of a plurality of the data centers capable of communicating with the user terminal via a network; and
determining, on a basis of the capability information, the network information, and required specification information necessary for executing the application, a data center having an instance that executes the application to be used by the user terminal from the plurality of data centers.

(11) An information processing system, including:
a user terminal;
a network;
a plurality of data centers capable of communicating with the user terminal via the network; and
an information processing apparatus including a decision unit that determines, on a basis of capability information of an instance that executes an application of the data center and network information relating to communication between the user terminal and the data center, which are acquired from each of the plurality of data centers, and required specification information necessary for executing the application, a data center having an instance that executes the application to be used by the user terminal from the plurality of data centers.

REFERENCE SIGNS LIST 1, 101 information processing system
2, 102 orchestrator (information processing apparatus)
3, 31, 32, 33 data center
4, 41, 42, 104, 1041, 1042 user terminal
6 mobile network (network)
21, 121 decision unit
71 cost information
72 capability information
73 network information
242 required specification information
521 scene information

The invention claimed is:

1. An information processing apparatus, comprising:
an acquisition unit configured to acquire capability information and network information from each data center of a plurality of data centers; and
a decision unit configured to determine, based on
the capability information of an instance for execution of an application of a data center and the network information relating to communication between at least one user terminal and the data center, which are acquired from each data center of the plurality of the data centers capable of communicating with the at least one user terminal via a network, and
required specification information necessary for executing the application,
a data center having an instance that executes the application to be used by the at least one user terminal from the plurality of data centers,
wherein the decision unit determines the data center having the instance that executes the application to be used by the at least one user terminal according to a change in scene information related to the application, the change being acquired via a server of each determined data center having the instance that executes the application,
wherein the change in the scene information related to the application is acquired via an application programing interface (API) server, and
wherein the acquisition unit and the decision unit are each implemented via at least one processor.

2. The information processing apparatus according to claim 1,
wherein the network information includes communication delay information, and
wherein the plurality of data centers includes at least two data centers having pieces of communication delay information with the at least one user terminal that are different from each other.

3. The information processing apparatus according to claim 2,
wherein the network information further includes throughput information.

4. The information processing apparatus according to claim 3,
wherein the decision unit determines, using reception of a start instruction or a stop instruction from the at least one user terminal or a change in the network information acquired from the data center as a trigger, the data center to be used by the at least one user terminal from the plurality of data centers.

5. The information processing apparatus according to claim 4,
wherein the application is a game application, and
wherein the decision unit further considers game title information and game scene information of the game application to be executed to determine the data center to be used by the at least one user terminal from the plurality of data centers.

6. The information processing apparatus according to claim 5,
wherein the required specification information is set in advance for each of a plurality of different game titles and a plurality of different game scenes.

7. The information processing apparatus according to claim 6,
wherein the decision unit further considers cost information acquired from each of the plurality of data centers to determine a data center to be used by the at least one user terminal from the plurality of data centers.

8. The information processing apparatus according to claim 2,
wherein the at least one user terminal includes a plurality of user terminals, and
wherein the decision unit determines a data center to be used by each user terminal of the plurality of user terminals based on
the capability information and the network information for each user terminal of the plurality of user terminals, which are acquired from each of the plurality of data centers, and
the required specification information.

9. An information processing method, comprising:
acquiring capability information of an instance for execution of an application of a data center and network information relating to communication between at least one user terminal and the data center, from each data center of a plurality of the data centers capable of communicating with the at least one user terminal via a network; and
determining, based on
the capability information, the network information, and
required specification information necessary for executing the application,
a data center having an instance that executes the application to be used by the at least one user terminal from the plurality of data centers,
wherein the data center having the instance that executes the application to be used by the at least one user terminal is determined according to a change in scene information related to the application, the change being acquired via a server of each determined data center having the instance that executes the application, and
wherein the change in the scene information related to the application is acquired via an application programing interface (API) server.

10. A non-transitory computer-readable storage medium having embodied thereon a program, which when executed by an information processing apparatus of a computer causes the information processing apparatus to execute a method, the method comprising:
acquiring capability information of an instance for execution of an application of a data center and network information relating to communication between at least one user terminal and the data center, from each data center of a plurality of the data centers capable of communicating with the at least one user terminal via a network; and
determining, based on
the capability information, the network information, and
required specification information necessary for executing the application,
a data center having an instance that executes the application to be used by the at least one user terminal from the plurality of data centers,
wherein the data center having the instance that executes the application to be used by the at least one user terminal is determined according to a change in scene information related to the application, the change being acquired via a server of each determined data center having the instance that executes the application, and
wherein the change in the scene information related to the application is acquired via an application programing interface (API) server.

11. An information processing system, comprising:
at least one user terminal;
a network;
a plurality of data centers capable of communicating with the at least one user terminal via the network; and
an information processing apparatus including
an acquisition unit configured to acquire capability information and network information from each data center of a plurality of data centers, and
a decision unit that determines, based on
capability information of an instance for execution of an application of the data center and network information relating to communication between the at least one user terminal and the data center, which are acquired from each of the plurality of data centers, and
required specification information necessary for executing the application,
a data center having an instance that executes the application to be used by the at least one user terminal from the plurality of data centers,
wherein the decision unit determines the data center having the instance that executes the application to be used by the at least one user terminal according to a change in scene information related to the application, the change being acquired via a server of each determined data center having the instance that executes the application,
wherein the change in the scene information related to the application is acquired via an application programing interface (API) server, and
wherein the acquisition unit and the decision unit are each implemented via at least one processor.

* * * * *